(12) United States Patent
Jilderos

(10) Patent No.: US 11,156,523 B2
(45) Date of Patent: Oct. 26, 2021

(54) DIFFERENTIAL PRESSURE MEASUREMENT MODULE WITH IMPROVED SENSOR PROTECTION

(71) Applicant: IMI HYDRONIC ENGINEERING INTERNATIONAL SA, Eysins (CH)

(72) Inventor: Daniel Jilderos, Brämhult (SE)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 471 days.

(21) Appl. No.: 16/088,670

(22) PCT Filed: Apr. 4, 2017

(86) PCT No.: PCT/EP2017/057926
§ 371 (c)(1),
(2) Date: Sep. 26, 2018

(87) PCT Pub. No.: WO2017/174547
PCT Pub. Date: Oct. 12, 2017

(65) Prior Publication Data
US 2020/0333205 A1 Oct. 22, 2020

(30) Foreign Application Priority Data
Apr. 4, 2016 (EP) ..................... 16163731

(51) Int. Cl.
*G01L 19/00* (2006.01)
*G01L 27/00* (2006.01)
*G01L 19/06* (2006.01)

(52) U.S. Cl.
CPC ...... *G01L 19/0038* (2013.01); *G01L 19/0015* (2013.01); *G01L 19/0618* (2013.01); *G01L 27/005* (2013.01)

(58) Field of Classification Search
CPC ............. G01L 19/0092; G01L 19/0618; G01L 19/0645; G01L 19/143; G01L 9/0051;
(Continued)

(56) References Cited

U.S. PATENT DOCUMENTS 3,224,020 A 12/1965 Ryutaro et al.
3,995,493 A * 12/1976 Nishihara ............... G01L 9/007
73/708
(Continued)

FOREIGN PATENT DOCUMENTS

DE 3235947 A1 12/1983
DE 19503488 A1 8/1996
(Continued)

OTHER PUBLICATIONS

Office Action (First Office Action) dated Jun. 30, 2020, by the China National Intellectual Property Administration in corresponding Chinese Patent Application No. 201780020649.1, and an English Translation of the Office Action. (14 pages).
(Continued)

*Primary Examiner* — Andre J Allen
(74) *Attorney, Agent, or Firm* — Buchanan Ingersoll & Rooney P.C.

(57) ABSTRACT

A measurement module for measuring the differential pressure between a first and second connection point arranged in a transport line for a fluid. The measurement module includes a first connection line and a second connection line, a differential pressure sensor arranged in fluid communication with said first and second connection line, and a valve arranged in fluid communication with said first and second connection line, wherein compared to said valve, said differential pressure sensor is arranged closer to the first and second connection point.

20 Claims, 5 Drawing Sheets

(58) Field of Classification Search
CPC . G01L 19/0007; G01L 19/0046; G01L 19/06;
G01L 19/0627; G01L 19/0681; G01L
27/002; G01L 9/00; G01L 9/0041; G01L
9/0044; G01L 11/025; G01L 11/04; G01L
19/0023; G01L 19/0672; G01L 19/069;
G01L 19/142; G01L 19/145; G01L 19/16;
G01L 7/00; G01L 9/0047; G01L 9/06;
G01L 9/065; G01L 9/12; G01L 11/02;
G01L 13/00; G01L 15/00; G01L 19/0015;
G01L 19/003; G01L 19/02; G01L
19/0609; G01L 19/083; G01L 19/10;
G01L 19/148; G01L 27/005; G01L 7/08;
G01L 7/082; G01L 7/163; G01L 7/166;
G01L 9/0045; G01L 9/0048; G01L 9/006;
G01L 9/007; G01L 9/0076; G01L 9/04;
G01L 9/045; G01L 9/125; G01L 11/00;
G01L 17/00; G01L 19/00; G01L 19/0076;
G01L 19/08; G01L 19/141; G01L 19/146;
G01L 1/142; G01L 1/2262; G01L 1/246;
G01L 21/12; G01L 23/16; G01L 27/007;
G01L 7/04; G01L 7/063; G01L 7/084;
G01L 7/086; G01L 7/16; G01L 9/0002;
G01L 9/0007; G01L 9/0016; G01L
9/0019; G01L 9/0022; G01L 9/0027;
G01L 9/0033; G01L 9/0039; G01L 9/005;
G01L 9/0058; G01L 9/0077; G01L
9/0079; G01L 9/008; G01L 9/0092; G01L
9/0095; G01L 9/025; G01L 9/08; G01L
9/085; G01L 9/105; G01L 9/14; G01L
9/16; G01L 9/0073; G01L 9/0052; G01L
19/0069; G01L 9/0075; G01L 9/0055;
G01L 19/0084; G01L 19/0038; G01L
19/14; G01L 13/025; G01L 9/0072; G01L
9/0054; G01L 19/04; G01L 9/0042; G01L
19/147
USPC .................................................. 73/700–756
See application file for complete search history.

(56) References Cited

U.S. PATENT DOCUMENTS

| | | | |
|---|---|---|---|
| 4,576,035 A * | 3/1986 | Hooven | G01L 27/005 600/561 |
| 4,817,022 A | 3/1989 | Jornod et al. | |
| 5,412,992 A * | 5/1995 | Tobita | G01L 9/065 338/4 |
| 5,916,180 A * | 6/1999 | Cundari | A61B 5/0053 600/587 |
| 6,023,978 A * | 2/2000 | Dauenhauer | G01L 9/045 338/42 |
| 2013/0092260 A1 * | 4/2013 | Jilderos | F16K 17/196 137/505 |
| 2013/0098475 A1 | 4/2013 | Jilderos | |
| 2013/0104663 A1 * | 5/2013 | Hedtke | G01L 9/00 73/717 |
| 2016/0123831 A1 * | 5/2016 | Sgourakes | G01L 19/0015 73/708 |
| 2016/0231193 A1 * | 8/2016 | Haldorsen | G01L 27/002 |
| 2017/0082515 A1 * | 3/2017 | Turner | G01L 19/0618 |
| 2017/0146418 A1 * | 5/2017 | Drewes | G01L 19/0618 |
| 2018/0017460 A1 * | 1/2018 | Batista | G01F 25/0092 |
| 2019/0120713 A1 * | 4/2019 | Sgourakes | G01L 19/0015 |

FOREIGN PATENT DOCUMENTS

| | | |
|---|---|---|
| EP | 0254843 A2 | 2/1988 |
| EP | 2585806 A1 | 5/2013 |
| GB | 2091883 A | 8/1982 |
| SE | 1000682 A1 | 1/2012 |
| WO | 2012002874 A1 | 1/2012 |

OTHER PUBLICATIONS

International Search Report (PCT/ISA/210) dated Oct. 4, 2017, by the European Patent Office as the International Searching Authority for International Application No. PCT/EP2017/057926.

Written Opinion (PCT/ISA/237) dated Oct. 4, 2017, by the European Patent Office as the International Searching Authority for International Application No. PCT/EP2017/057926.

* cited by examiner (Prior art) Fig. 1a

DIFFERENTIAL PRESSURE MEASUREMENT MODULE WITH IMPROVED SENSOR PROTECTION

TECHNICAL FIELD

The present invention relates to the field of measurement modules. In particular the present invention relates to pressure measurement modules being used for HVAC systems.

BACKGROUND

A differential pressure sensor (DPS) may be used with a valve assembly which principally is aimed to protect the DPS against high continuous pressures or pressure shocks, i.e. a continuous pressure or a pressure shock which is higher than the DPS can tolerate. Such valve assemblies may also have a function for calibrating the DPS. The calibration may be a so called zero point calibration, where a calibration procedure subjects both measuring sides of the DPS to the same pressure before a differential pressure measurement begins.

There are several constructions which aim at protecting a DPS against high differential pressures. For example, DE19503488 discloses a device with two separate safety valves (4, 5) that protects the DPS. GB2091883A discloses a device with two separate safety valves (46, 48) for protection against high differential pressures. Hence, these devices require at least two safety valves to protect the DPS, which consequently makes the manufacturing of these devices more expensive and more difficult.

EP2585806 discloses a thereto improved construction having a safety valve cone which is arranged displaceable in a cavity, so that by a differential pressure higher than a dimensioned value, the safety valve cone is displaced in the cavity from the high pressure side towards the low pressure side, whereby a displacement provides a passage between a connection downstream and upstream of a control valve in order to perform a pressure equalization to protect a DPS.

However, there is a desire to further reduce the complexity, as the currently used solutions may have many parts which may lodge, need maintenance or are otherwise cumbersome. Further, there is a desire to ensure that gas bubbles are not present within the measurement module in order to ensure a desirable measurement accuracy.

There is thus a need for improving the state of the art to provide a measurement module which at least partly solves these problems.

SUMMARY OF THE INVENTION

It is an object of the present invention to improve the current state of the art, to solve or alleviate at least some of the above problems, and to provide an improved measurement module. These and other objects are achieved by a measurement module according to the accompanying claims.

According to a first aspect of the present invention, a measurement module for measuring the differential pressure between a first and a second connection point arranged in a transport line for a fluid is provided. The measurement module comprises a first connection line for being connected to the first connection point, and a second connection line for being connected to the second connection point;

a differential pressure sensor arranged in fluid communication with the first and second connection line;

a valve arranged in fluid communication with the first and second connection line, the valve having an open state and a closed state, wherein the valve in the open state fluidly connects the first and second connection line via the valve, wherein the valve in the closed state prevents fluid flow between the first and second connection line via the valve; and wherein the first connection line is adapted to be connected to the first connection point and is configured to extend from the first connection point to the valve, and the second connection line is adapted to be connected to the second connection point and is configured to extend from the second connection point to the valve, wherein, compared to the valve, the differential pressure sensor is arranged closer to the first and the second connection point.

The present invention is based on the realization that by placing a valve further away from a connection point than the differential pressure sensor means that the valve, when opened, efficiently flushes any gas bubbles away from the differential pressure sensor by enabling a fluid flow past the differential pressure sensor. In other words, the valve functions as a flushing mechanism.

The valve may also have the function of a safety valve for protecting a differential pressure sensor from high pressure differences. The valve may thus, in at least some embodiments, be seen as a dual-acting valve which protects the differential pressure sensor from overpressure and may flush through the measurement module in order to remove gas bubbles.

By enabling the valve to function as a flushing mechanism, the measurement accuracy of the measurement module may be improved as gas bubbles, such as air bubbles, present in the measurement module degrades the measurement accuracy. Further, by flushing the fluid past the differential pressure sensor, the temperature of the differential pressure sensor may equalize towards the temperature of the fluid, which also improves the measurement accuracy.

It should be noted that the terms a first and second connection point arranged in a transport line for a fluid, is to be interpreted as before and after a point or portion of a fluid system in which the measurement module may be used. Hence, the second connection point may be arranged downstream of the first connection point. In principle, the measurement module may be used to measure any point in a fluid system such as e.g. a HVAC system.

According to various exemplary embodiments, the measurement module may for example be used to measure the differential pressure and thus flow over e.g. a control valve, a pump, orifice plate, measuring flange, pipe circuits or the like in a fluid system. Alternatively, the measurement module may be used to measure the differential pressure before or after a portion of the fluid system, such as measuring the pressure over several rooms, in a building in which the fluid system is installed, or portions of the system. In another embodiment the measurement module may be used to measure the differential pressure at the start and at the end of the fluid system, for example by measuring the pressure before and after a circulation pump or a driving pump.

In at least one exemplary embodiment, the valve has the function of a safety valve and is configured to protect the differential pressure sensor from overpressure from either the first or second connection line. Stated differently, the safety valve may be set in the open state if a differential pressure between the first and second connection line exceeds a differential pressure threshold regardless of whether the first connection line or the second connection line contains fluid at the higher pressure. Such a safety valve may also be used of calibration of the measurement module. Hence, such a safety valve may be seen as a triple-acting safety valve which protects the differential pressure sensor from overpressure from either side and is used for calibration.

In at least one exemplary embodiment, the valve (which may or may not have a safety valve function) comprises biasing means for biasing the valve towards the closed state. Biasing the valve back to the closed state means that the valve automatically returns to the closed state after being activated in order to allow further differential pressure measurement(s) to be performed.

In at least one exemplary embodiment, the biasing means are formed by at least one resilient member connected to at least one of a valve plug or a valve seat, wherein the at least one of a valve plug or a valve seat is arranged in a connecting chamber between the first and second connection line, and the at least one of a valve plug or a valve seat is configured to, in the closed state, prevent a fluid flow between the first and second connection line and in the open state enable a fluid flow between the first and the second connection line.

The valve plug or valve seat may be provided in the form of a plate, e.g. a valve plate. The resilient member may be a spring, such as a coil spring or any other type of compressible and/or extendable resilient member which induces a force when being compressed or extended. The spring may be made of a metal or a metal alloy such as stainless steel or the like.

In at least one embodiment, the measurement module further comprises a sealing element arranged in the connecting chamber. The sealing element is preferably arranged in the connecting chamber such that the valve plug or a valve seat engages with the sealing element to prevent a fluid flow from either one of the connection lines to the other one of the connection lines. Preferably, the valve plug or valve seat has a shape corresponding to the shape of the connecting chamber. For example, the connecting chamber may have a round, oval, or polygonal cross section.

In at least one exemplary embodiment, the at least one resilient member is configured to set the open state by allowing the valve plug or valve seat to move within the connecting chamber if a pressure difference between the first and second connection line reaches a differential pressure threshold to equalize the pressure between the first and second connection line (i.e. in such embodiment said valve has the function of a safety valve). Movements of the valve plug or valve seat may set the open state by allowing a fluid to bypass the valve plug or valve seat. This may be facilitated by providing the connecting chamber with an increased radius, i.e. a radius larger than the valve plug or valve seat, along the direction of movement, or some sort of channel or groove which allows a fluid to bypass the valve plug or valve seat when the valve plug or valve seat has moved sufficiently far within the connecting chamber. The differential pressure threshold may be set by configuring the force provided by the resilient member. The differential pressure threshold may be set at a differential pressure less than the differential pressure burst pressure but higher than the measurable pressure range. For example, if the sensor has a measuring range of 0-5 bars and a burst pressure of 15 bars the threshold may be set to 10 bars.

In at least one exemplary embodiment, the valve (which may or may not have a safety valve function) comprises a first resilient member connected to a valve seat and a second resilient member connected to a valve plug, wherein the first resilient member and the valve seat are arranged on a first side of the connecting chamber towards the first connection line, and wherein the second resilient member and the valve plug are arranged on a second side of the connecting chamber towards the second connection line, and wherein the valve seat and the valve plug are in contact in the closed state. The first side may be opposite the second side. Hence, the first and second resilient members may provide forces working in opposite direction in order to hold the valve plug and the valve seat in contact in a closed state and thereby seal the valve in the closed state.

In at least one exemplary embodiment, the measurement module further comprises an actuator for actuating said valve into said open state for enabling fluid to be flushed through the measurement module. Thus, the actuator can actively open valve. The actuator may be a manual actuator or a powered actuator. The actuator may be operated by a person, or it may be programmed to be activated, e.g. at certain time intervals or pressure threshold.

The time required for removing air bubbles from the measurement module may be dependent on the differential pressure over the control valve or transport line to which the differential pressure sensor is connected to. If the differential pressure is relatively low, it will take longer time to flush out the air compared to if the differential pressure is relatively high. Therefore, in at least one exemplary embodiment, the measuring module implements a function so that the differential pressure sensor measures the differential pressure before starting the flushing and adapts the flushing time to the actual time it takes to get the air out. For instance, according to at least one exemplary embodiment, the measurement module comprises means to calculate a flushing time based on a differential pressure measured by the differential pressure sensor. Such calculating means may be included in or connected to a control unit and/or its microprocessor (those components will be discussed further below).

In at least one exemplary embodiment, said actuator is a calibration actuator for actuating the valve into the open state for enabling a zero-point calibration of the differential pressure sensor. The calibrating function of the valve may be combined with a safety valve function. Thus, in at least some exemplary embodiments said valve is a safety valve, wherein the measurement module further comprises a calibration actuator as mentioned above. Thus, a valve for protecting a differential pressure sensor from high pressure differences may also be utilized as a calibration mechanism by including a calibration actuator sets the safety valve in the open state, i.e. opens the safety valve.

In at least one exemplary embodiment, the measurement module further comprises a calibration actuator for actuating the valve into the open state for enabling a zero-point calibration of the differential pressure sensor, the calibration actuator is arranged to move one of the valve plug or valve seat when actuating the valve (the valve may, for instance, be a safety valve). The calibration actuator further enables the valve to be opened to e.g. flush past the differential pressure sensor and remove a gas bubble(s) at a suitable time, such as before a measurement is to be performed with the measurement module. This means that when a zero-point calibration is performed, i.e. by actuating the calibration actuator, the fluid in the first and/or second connection line moves past the differential pressure sensor and thereby reduces temperature differences which may reduce the measurement accuracy as well as facilitating the removal of gas bubbles, e.g. air bubbles, which have formed are efficiently flushed through and away from the differential pressure sensor. The calibration actuator only needs to move one of the valve seat or valve plug which means that the calibration actuator may be actuated utilizing less force. Alternatively, the calibration actuator may be configured to move both the valve plug or valve seat. In at least one exemplary embodiment, the valve plug or valve seat comprises a through-going opening through which the calibration actuator may extend. Thereby, the calibration actuator may push one of the valve plug or the valve seat without affecting the other one of the valve plug or valve seat.

In at least one exemplary embodiment, the calibration actuator is a manual calibration actuator, or the calibration actuator is a powered actuator. Advantageously the calibration actuator may be manually activated e.g. by an operator which actuates the calibration actuator by pushing, pulling or otherwise activates the calibration actuator via mechanical force. Alternatively, the calibration actuator may be powered e.g. by electrical, pneumatic, hydraulic or other means such that the calibration actuator may be operated remotely. If pneumatic or hydraulic means are used, a solenoid valve may be used to actuate the calibration actuator. A combination of manual and powered calibration actuator is of course possible so that an operator may also manually actuate the calibration actuator.

In at least one exemplary embodiment, the calibration actuator comprises a powered actuator, and the measurement module further comprises a control unit connected to the differential pressure sensor and to the powered actuator for setting the open state if a pressure difference between the first and second connection line reaches a differential pressure threshold to equalize the pressure between the first and second connection line. This means that when a zero-point calibration is performed, i.e. by the control unit actuating the powered calibration actuator, the fluid in the first and/or second connection line moves past the differential pressure sensor and thereby reduces temperature differences which may reduce the measurement accuracy as well as facilitating the removal of gas bubbles, e.g. air bubbles. Hence, the valve may be operated into the open state by the powered calibration actuator based on the measured differential pressure by the differential pressure sensor. In case the valve is configured to function as a safety valve, the differential pressure threshold may be set at a differential pressure less than the differential pressure burst pressure of the sensor but higher than the measurable pressure range. For example, if the sensor has a measuring range of 0-5 bars and a burst pressure of 15 bars the threshold may be set to 10 bars. The control unit may comprise a microprocessor with thereupon stored computer program code. Alternatively, the control unit may comprise a general purpose processor and a non-transitory memory which stores computer program code, which code when executed by the processor causes the control unit to continuously monitor the measured differential pressure, and if the differential pressure exceeds the differential pressure threshold, actuate the calibration actuator in order to set the open state, e.g. open the safety valve.

In at least one exemplary embodiment, the control unit is configured to control the powered actuator to set the valve in the open state while no measurements are performed by the differential pressure sensor, and wherein the control unit is configured to set the valve in the closed state prior to or while measurements are performed by the differential pressure sensor. This means that there is less risk to subject the differential pressure sensor to high differential pressures during use where the valve is set in the open state and thereby enables a fluid flow via the valve between the first and second connection line whereby a pressure equalization between the first and second connection line is enabled. Further, the differential pressure sensor is continuously zero-point calibrated as the open state of the valve means that the two sides of the differential pressure sensor is subjected to the same pressure. Compared to a measurement module having a manual calibration actuator, a difference is that the differential pressure sensor is thus ready and zero-point calibrated to perform a measurement as soon as the valve starts to close. In case of the valve being in the form of a safety valve, then by setting the safety valve in the closed state prior to a measurement, a pressure exceeding the differential pressure threshold may open the safety valve before the safety valve is fully closed and the high differential pressure harms the differential pressure sensor.

In at least one exemplary embodiment, the differential pressure sensor is arranged between the first and second connection line. This facilitates the manufacturing of a compact measurement module. Further, there may be no need for an additional connection line connecting the differential pressure sensor to the first and/or second connection line. In at least one embodiment, the first and second connection line may extend substantially parallel, wherein the first and second connection line each has a DPS connection point for connecting to the DPS. The DPS connection points are arranged between the two ends of the first and second connection line. The DPS connection points may, in principle, be arranged anywhere along the longitudinal extension of the first and second connection lines. The first and second connection line may extend at least partly in parallel, and the differential pressure sensor may be arranged in a position between the first and second connection line. That the first and second connection line extend at least partly in parallel means that at least a portion of one of the connection lines has a longitudinal extension which is parallel with the other one of the connection lines.

In at least one exemplary embodiment, the measurement module further comprises a power supply and a non-transitory memory, wherein the non-transitory memory is connected to the power supply and the differential pressure sensor for storing measurement values from the differential pressure sensor. The measurement module may thereby store values from the differential pressure measurement over longer time periods instead of only measuring the differential pressure at specific points in time.

In at least one exemplary embodiment, the measurement module further comprises a power supply and a wired or wireless transceiver for transmitting measurement values from the differential pressure sensor. The measurement module may thereby be controlled remotely, or perform measurements and calibrations autonomously and transmit measurement(s) to a centralized computer system such as a remote server.

Although not explicitly mentioned, for each one of the above exemplified (and other) embodiments, said valve may be a safety valve.

According to a second aspect of the present invention, a measurement system for a fluid system is provided. The measurement system comprises a measurement module according to the first aspect, and a data collection unit for connecting to the measurement module and performing a differential pressure measurement using the measurement module.

Effects and features of this second aspect of the present invention are largely analogous to those described above in connection with the first aspect of the invention. Embodiments mentioned in relation to the first aspect of the present invention are largely compatible with the second aspect.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein:

FIG. 1a is a schematic view of a measurement module in accordance with the prior art.

FIG. 4b is an exploded perspective view of the measurement module shown in FIG. 4a.

DETAILED DESCRIPTION OF THE DRAWINGS

Figure 1B:
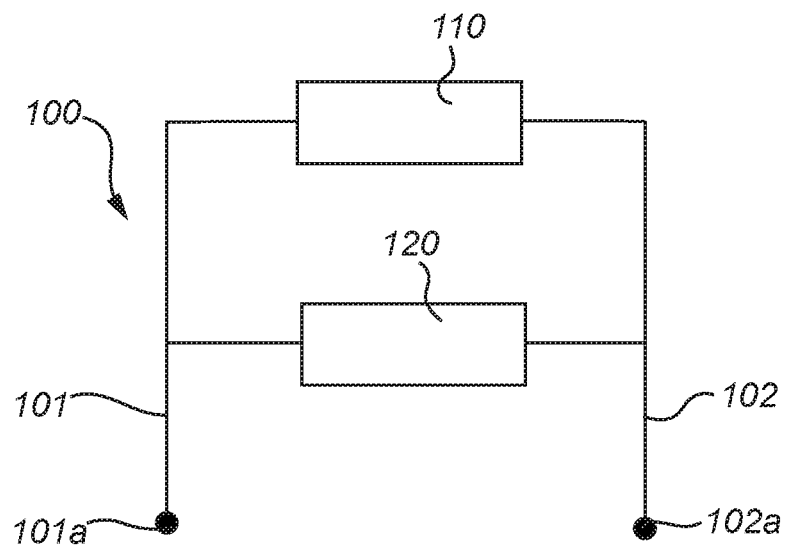
FIG. 1b is a schematic view of a measurement module in accordance with an embodiment of the invention.
Figure 1B:
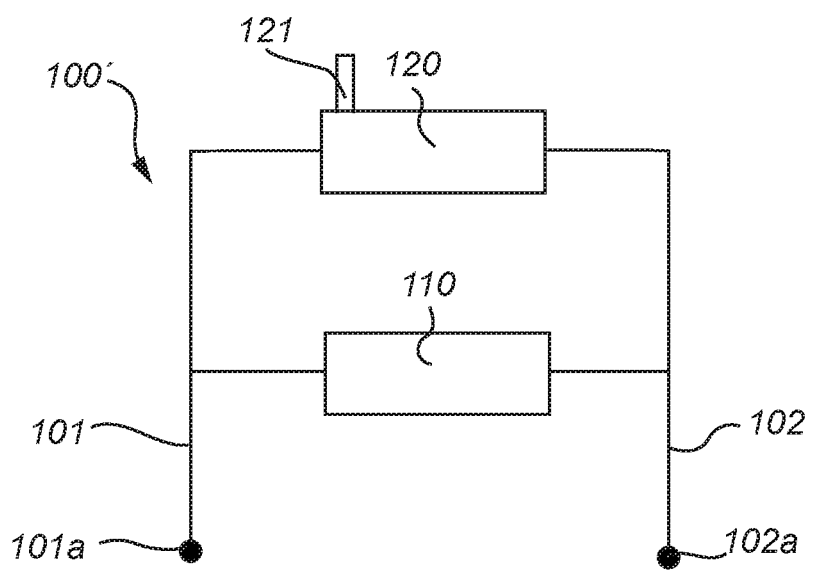

In the present detailed description, embodiments of a measurement module according to the present invention are mainly discussed with reference to views showing measurement module according to various embodiments of the invention. It should be noted that this by no means limits the scope of the invention, which is also applicable in other circumstances for instance with other types or variants of measurement module, fluids, pipes, valves or components than the embodiments shown in the appended drawings. Further, that specific features are mentioned in connection to an embodiment of the invention does not mean that those components cannot be used to an advantage together with other embodiments of the invention. The invention will now be described with reference to the enclosed drawings where first attention will be drawn to the structure, and secondly to the function.

The following description may use terms such as "horizontal", "vertical", "lateral", "back and forth", "up and down", "back and front", "upper", "lower", "back", "forward", "front", "rear", "downstream", "upstream", etc. These terms generally refer to the views and orientations as shown in the drawings and that are associated with a normal use of the invention. The terms are used for the sake of convenience only and shall not be limiting.

A measurement module according to the present invention may be suitable for being installed or used for a fluid system such as a HVAC system. For example, when a flow of fluid in a transport line reaches a control valve or orifice plate the flow is impeded. The measurement module may be arranged to measure the pressure both upstream and downstream of the control valve or orifice plate, i.e. the differential pressure, using a differential pressure sensor (DPS). Alternatively, the measurement module may be arranged to measure the differential pressure upstream and downstream of portions or sections of the HVAC system. The measurement module may be removably attached, permanently attached, or having some parts which are attached and other parts which are removably attached to e.g. a transport line. The measurement module comprises a valve, which may be a safety valve which acts as an overpressure protection for the DPS. Further, there may be a need flush the measurement module to clear the first and the second connection line from gas bubbles; therefore the path between the upstream and downstream measurement point may be opened by including an actuator, which, automatically or manually, actuates the valve (or safety valve) in order to flush fluid from the transport line. The actuator may be a calibration actuator. For instance, there may be a need to zero-point calibrate the DPS before measuring the differential pressure; therefore the path between the upstream and downstream measurement point may be opened by including a calibration actuator which, automatically or manually, actuates the valve (or safety valve) in order to zero-point calibrate the DPS by flushing fluid from the transport line.

In the detailed description of the drawings, the measurement module of the embodiments of the invention is illustrated as having a valve. For convenience, the valve is described as a safety valve, i.e. protecting the differential pressure sensor from being subjected to large pressure differences. However, it should be understood, that the invention is not limited to the valve being in the form of a safety valve; on the contrary measurement modules comprising a differential pressure sensor and a valve without a safety valve function are also encompassed by the general inventive concept.

FIG. 1a schematically illustrates a known measurement module 100 according to prior art measurement modules, whereas FIG. 1b schematically illustrates a measurement module according to embodiments of the invention. The measurement module 100' comprises a first connection line 101, and a second connection line 102. The first connection line 101 is adapted to be connected upstream of a component or portion of a fluid system, and the second connection line is adapted for being connected downstream of a component or portion of a fluid system. For example, as shown in FIG. 1b, the first connection line 101 is connected to a first connection point 101a. The first connection point 101a is arranged upstream of a component or portion of a fluid system. The second connection line 102 is connected to a second connection point 102a. The second connection point 102a is arranged downstream of a component or portion of a fluid system.

The measurement module 100' comprises a differential pressure sensor 110 (DPS). The DPS 110 may be configured to provide an electric signal, either analog (e.g 0-10V, 2-10V 4-20 nA) or digital (e.g I²C, bus communication), indicative of a differential pressure between the first and the second connection line 101, 102. The DPS 110 may be directly or indirectly in fluid connection with the first and second connection lines 101, 102. Direct fluid connection means that the fluid within the first and second connection lines 101, 102 reaches the measurement surfaces of the DPS 110, whereas indirect fluid connection means that the fluid within the first and second connection lines 101, 102 does not reach the measurement surfaces of the DPS 110. In an indirect fluid connection, a protective fluid and a membrane (not shown) may be arranged between the first and second connection line 101, 102 and the DPS 110 in order to provide an indirect fluid contact. A protective fluid and a membrane arranged between the first and second connection line 101, 102 and the DPS 110 may be a part of the DPS 110, as in provided in a package by a DPS manufacturer, or be provided separately and arranged during assembly of a measurement module.

The measurement module 100' also comprises a safety valve 120. The safety valve 120 is arranged in fluid communication with the first and second connection line 101, 102. The safety valve 120 has an open state which fluidly connects the first and second connection line 101, 102 via the safety valve 120, and a closed state in which the safety valve 120 prevents fluid flow between the first and second connection line 101, 102 via the safety valve 120. The safety valve 120 should thus be understood as being activated by a pressure difference between the first connection line 101 and the second connection line 102 which exceeds a differential pressure threshold. The differential pressure threshold at which the safety valve 120 is actuated, e.g. from the closed state to the open state, is preferably set sufficiently far below a differential pressure at which the DPS 110 is damaged in order to protect the DPS 110 from any damage. The differential pressure threshold may be set at a differential pressure less than the differential pressure burst pressure but higher than the measurable pressure range. For example, if the sensor has a measuring range of 0-5 bars and a burst pressure of 15 bars the threshold may be set to 10 bars for the DPS 110.

The measurement module 100' may also comprise a calibration actuator 121 for actuating the safety valve 120 into the open state. The calibration actuator may be used to enable a zero-point calibration of the DPS 110.

Note that there are differences between the known measurement module 100 shown in FIG. 1a and the measurement module 100' shown in FIG. 1b. The known measurement module 100 does not comprise a calibration actuator. Further, in FIG. 1a the first and second connection lines 101, 102 are connected via the safety valve 120 to the DPS 110. Hence, the safety valve 120 is arranged closer to the first and second connection points 101a, 102a than the DPS 110. This means that even if the safety valve is opened, e.g. using the calibration actuator 121, an gas bubble may stick at the DPS 110 as there is no fluid flow to remove such as gas bubble. In FIG. 1b the first and second connection lines 101, 102 are connected via the DPS 110 to the safety valve 120. Hence, the DPS 110 is arranged closer to the first and second connection points 101a, 102a than the safety valve 120. This means that when the safety valve 120 opened, e.g. during a zero point calibration, the fluid flow circulates or moves past the DPS 110, and gas bubbles which may reduce the measurement accuracy, e.g. air bubbles, which have formed within the measurement module are efficiently flushed through and away from the DPS 110, and temperature differences which may reduce the measurement accuracy are also reduced.

Figure 2A:
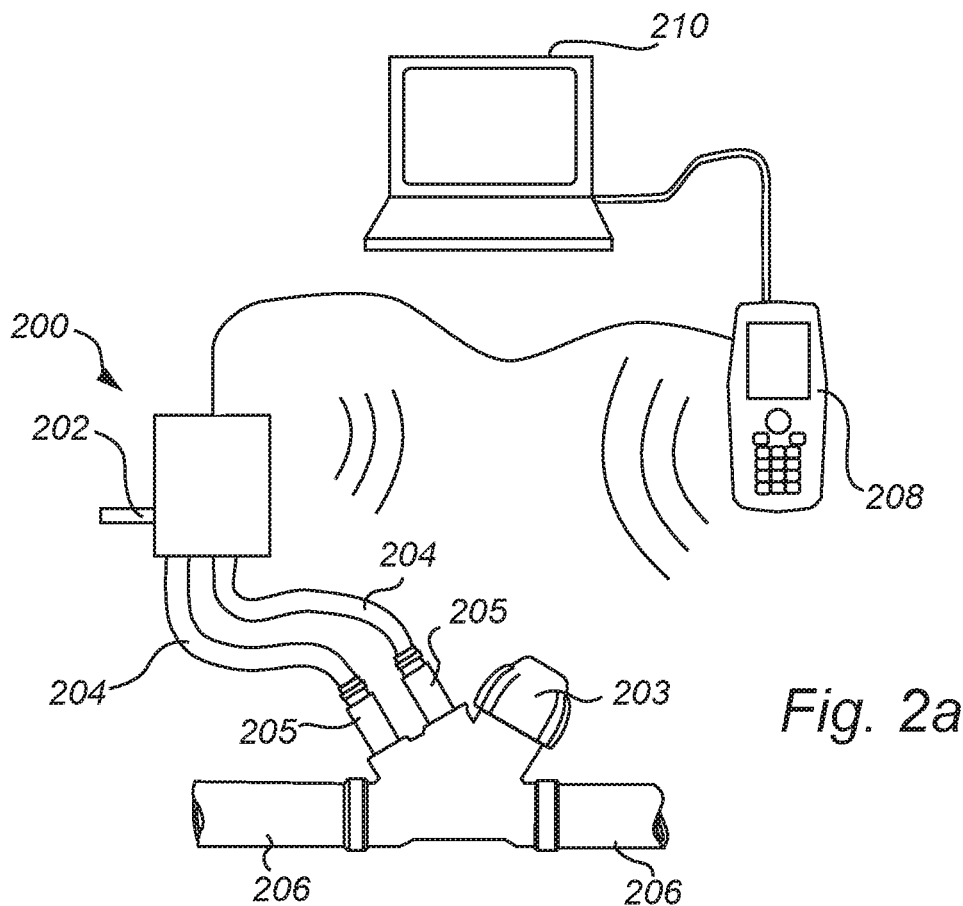
FIGS. 2a and 2b show a part of a fluid system where a differential pressure measuring system is connected.

FIG. 2a shows an example of a measurement module 200, in a measurement system, having a manually activated calibration actuator 202. The measurement module 200 is connected via measuring hoses 204 to the measuring nipples 205 of a control valve 203. The control valve 203 may for example be used to control the amount of fluid flowing through a transport line 206, whereas the measurement module 200 is used to measure the pressure upstream and downstream of the control valve 203. Also illustrated in FIG. 2a is a data collection unit e.g. hand-held unit 208 which is used to connect to the measurement module 200 via a wired or wireless connection in order to measure the differential pressure using the measurement module 200. The measurement module 200 may comprise a wireless transceiver (not shown) in order to send and receive wireless signals and instruction.

In order to ensure that the measurement is as accurate as possible, an operator may for example flush and calibrate the measurement module and DPS therein using the manually activated calibration actuator 202. The hand-held unit 208 may later or simultaneously be connected to a computer system 210 such as a server via wired or wireless means (not shown) in order to register the result(s) of the differential pressure measurement to a database or the like. A differential pressure measurement may be performed at certain regular points in time, or specifically after adjusting the control valve 203 to adapt the fluid flow in the transport line 206, after which it may be important to control the pressure upstream and downstream of the control valve 203. It should be noted that although the control valve 203 shown is a manual control valve, it is of course possible to use an automatic control valve or any other type of valve. In an alternative embodiment (not shown), the measurement module 200 may be in direct wired or wireless control with the computer system 210. Hence, a measurement system may comprise the measurement module 200 and computer system 210 and/or the data collection unit 208.

Figure 2B:
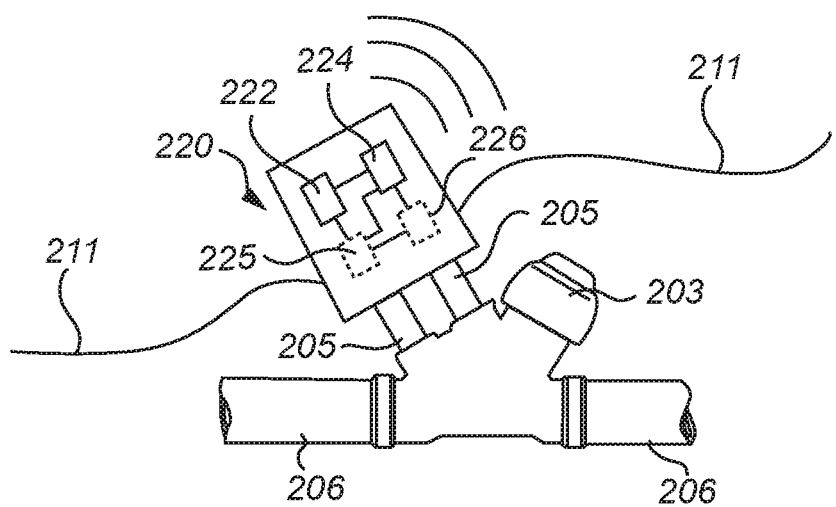

FIG. 2b shows another measurement module 220, in a measurement system, having an automatically activated calibration actuator 222. The measurement module 220 is in the illustrated embodiment connected directly to the measuring nipples 205 of a manual control valve 203. The measurement module 220 may be fixated to the nipples 205 and remain in place after installation. Alternatively, the measurement module may be removably attached and be used e.g. when the control valve 203 is manipulated to adapt the fluid flow in the transport line 206. Hence, prior to manipulating the control valve 203, the measurement module 220 may be installed, and the automatic calibration actuator 222 activated to perform a zero-point calibration and, suitably, to flush the connections and chamber within the measurement module 220 to remove air bubbles and the like and equalize the temperature of the components of the measurement module with the fluid in order to increase measurement accuracy. The measurement module 220 may communicate and be connected to a hand held unit 208 and to a computer system such as a server 210 in the same manner as described for the measurement module 200 shown in FIG. 2a. One difference between the measurement module 220 and the measurement module 200 is that the measurement module 220 is adapted to be connected directly to the control valve 203. This may be facilitated e.g. via the threads shown for the exemplary measurement module 400 in FIGS. 4a and 4b, or by other known means for attachment. However, it should be understood that in other embodiments the measurement module 220 may be connected via measuring hoses to the measuring nipples 205 (similarly to the embodiment in FIG. 2a).

The measurement module 220 may comprise a control unit 224 connected to the automatic calibration actuator 222 and the DPS (not shown). The control unit 224 may actuate the automatic calibration actuator 222 to open the safety valve (not shown) if a differential pressure measured by the DPS (not shown) within the measurement module 220 indicates a differential pressure exceeding a differential pressure threshold. The measurement module may also comprise a non-transitory memory 226 connected to the control unit in order to store measurement values from the DPS. The measurement module 220 may also comprise a power supply 225 connected to the other components of the measurement module 220. The power supply may be an energy storage device, such as a battery or capacitor. Alternatively, the power supply may be an electric circuit for converting AC or DC current into a form suitable for use with the measurement module 220, and the power supply may be connected via electric wires 211 which supply electric power from the grid.

Figure 3:
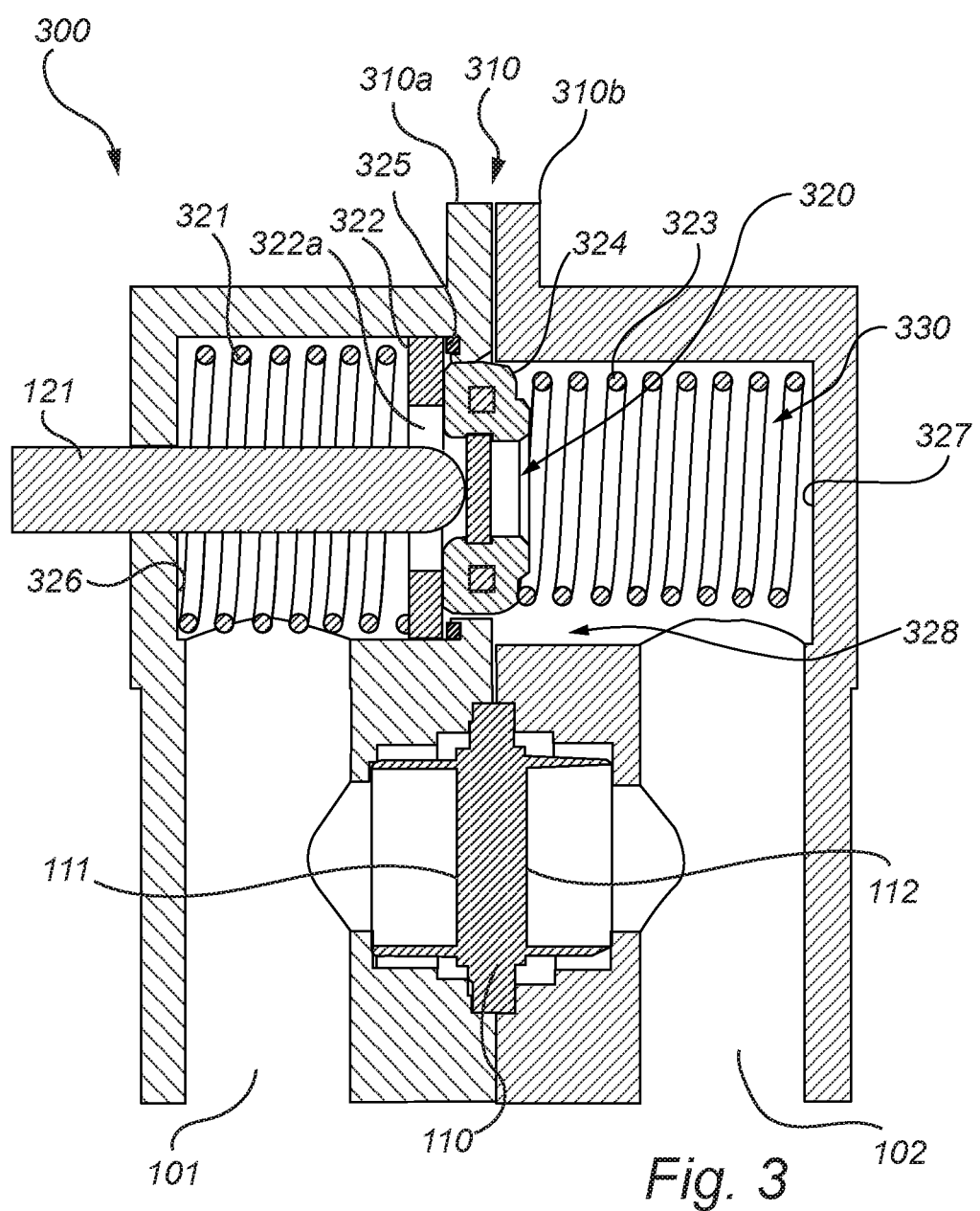
FIG. 3 is a cross sectional view of a measurement module in accordance with at least one embodiment of the invention.

FIG. 3 is a cross sectional view of a measurement module 300 according to an embodiment of the invention. The measurement module 300 comprises a first connection line 101, a second connection line 102, a DPS 110, a mechanical safety valve 320, and a manual calibration actuator 121.

The components of the measurement module 300 are arranged in housing 310. The housing 310 may be molded or additively manufactured. The housing 310 may be made of a plastic material or at least partly made of metal. The housing 310 may be made in two or more parts, such as parts 310a, 310b indicated in FIG. 3, and then assembled. By making the housing 310 in several parts, the insertion and/or assembly of the measurement module 300 may be facilitated. The DPS is arranged between the first and second connection line 101, 102. The DPS 110 has a first measurement surface 111 facing the first connection line 101, and a second measurement surface 112 facing the second connection line 102.

The mechanical safety valve 320 shown in FIG. 3 comprises biasing means 321, 323 for biasing said safety valve towards the closed state. In FIG. 3, the biasing means 321, 323 are formed by a first resilient member 321 connected to a valve seat 322, and a second resilient member 323 and a valve plug 324. The valve seat 322 and the valve plug 324 are shaped as plates, e.g. valve plates. The springs 321, 323 and the valve plates 322, 324 are arranged in a connecting chamber 330. The connecting chamber 330 is arranged between between the first and second connection line 101, 102. The first and second valve plates 322, 324 are, in a closed state as illustrated in FIG. 3, configured to prevent a fluid flow between the first and second connection line 101, 102 and in an open state enable a fluid flow between the first and second connection line 101, 102. The mechanical safety valve 320 further comprises a seal 325, preferably in the shape of an o-ring. The seal 325 may be made of rubber or plastic. The first spring 321 and the valve seat 322 are arranged on a first side 326 of the connecting chamber 330 towards the first connection line 101, and the second spring 323 and the valve plug 324 are arranged on a second side 327 of the connecting chamber 330 towards the second connection line 102. The second spring 323 pushes the valve plug 324 towards the valve seat 322, and the first spring 321 pushes the valve seat 322 towards second side 327 and against the seal 325 in order to seal the flow of fluid between the first and second connection line 101, 102.

Note that the first valve plate 322 is larger than the second valve plate 324 so that the first valve plate 322 is enabled to seal against the seal 325. The first valve plate 322 is thereby restricted in its movement towards the second side 327 by the seal 325, whereas the second valve plate 324 may move towards the first side 326, i.e. the left and follow the movement of the first valve plate 322 as the first spring 321 is compressed. Also note that the size of the connecting chamber 330 increases at an opening step 328, towards the second side 327 along the direction of travel for the second valve plate 324, which means that a fluid may bypass the second valve plate 324 after the second valve plate 324 has moved sufficiently far enough in the connecting chamber 330 to the right, i.e. past the opening step 328.

The safety valve 320 is configured to be set in the open state, i.e. opened, by allowing the first valve plate 322 and/or the second valve 324 plate to move within the connecting chamber 330 if a pressure difference between the first and second connection line 101, 102 reaches a differential pressure threshold. Hence, the differential pressure threshold is configured by the cross sectional area of the opening 322a in the first valve plate 322, the cross sectional area of the second valve plate 324 and the resistance of the first and second springs 321, 323 respectively. Note that the first valve plate 322 has an opening 322a through which the calibration actuator 121 extends.

FIG. 3 shows the safety valve 320 in a neutral position, i.e. when safety valve 320 is not exposed to a differential pressure high enough to affect any movement of the first and/or second valve plate 322, 324. Hence, the valve plates 322, 324 are in a central position between the first and second sides 326, 327 of the connecting chamber 330, and the first and second connection lines 101, 102. In this position the passage through the connecting chamber 330 is closed by the mechanical safety valve 320 and as a result fluid flow between the first and second connection lines 101, 102 is prevented. The fluid flow is prevented by the sealing that occurs by means of the seal 325 onto which the valve seat 322 presses and the contact between the valve seat 322 and the valve plug 324.

In use, the differential pressure, i.e. the pressure difference between the first and second connection line 101, 102 and consequently the pressure difference upstream and downstream of for example a control valve (see e.g. FIGS. 2a and 2b) may exceed a configured differential pressure threshold of the mechanical safety valve 320. There are two cases of this occurring, if the pressure in the first connection line 101 is higher than the pressure in the second connection line 102 and the force of the pressure acting against the cross sectional area of the opening 322a and thus the valve plug 324, exceeds the force of the pressure acting on the valve plug 324 and the force of the second spring 323, the valve plug 324 moves towards the second side 327 and the pressure is relieved when the valve plug 324 has moved to the opening step 328. If the pressure in the second connection line 102 is higher than the pressure in the first connection line 101 and the force of the pressure acting against the cross sectional area of the valve plug 324 and the force of the second spring 323 exceeds the force of the pressure acting on the cross sectional area of the valve seat 322, including the opening 322a, and the force of the first spring 321, the first and second valve plates 322, 324 move towards the first side 326 and the pressure is relieved when the valve seat 322 and valve plug 324 has moved sufficiently far, e.g. to the first connection line as shown in FIG. 3. Alternatively, there may be an opening step (not shown) also towards the first side 326 of the connection chamber. In other words, if a the differential pressure exceeds the value for which the mechanical safety valve 320 is configured, the valve plate(s) 322, 324 starts to move towards the side with the lower pressure, and the spring on that side is compressed. By the movement of the valve plate(s) 322, 324, a passage in the connecting chamber 330 between the first and second connection lines 101, 102 is opened, and a fluid flow is enabled from one of the connections lines to the other, e.g. the first connection line 101, to the second connection line 102, through the connecting chamber 330 past the valve plates 322, 324. This is possible in both direction, and the mechanical safety valve 320 may thus be construed as a bi-directional safety valve.

In an alternative embodiment (not shown) the above functionality may be provided e.g. by a single movable valve plate which is arranged in connecting chamber having openings steps on opposite sides. The single movable valve plate may be connected to one or more resilient member(s) which bias the single movable valve plate towards a closed state between the two opposite sides of the connecting chamber.

In use, a zero-point calibration is performed by actuating the calibration actuator 121. As shown in FIG. 3, the calibration actuator then pushes and moves the second valve plate 324 towards the second side 327 in order to allow a fluid flow through the connecting chamber 330.

Alternatively, a calibration actuator may be arranged to move both (not shown) the first and second valve plates 322, 324. Alternatively, the calibration actuator may be arranged to move the first valve plate 322 instead of the second valve plate 324 (not shown). A calibration actuator may be configured to move a valve plate through pulling instead of pushing.

The calibration actuator 121 may be a manual calibration actuator which is operated by pushing on the actuator from the left, or the calibration actuator 121 may be an powered actuator which may be remotely operated electrically, pneumatically or hydraulically (not shown).

Figure 4A:
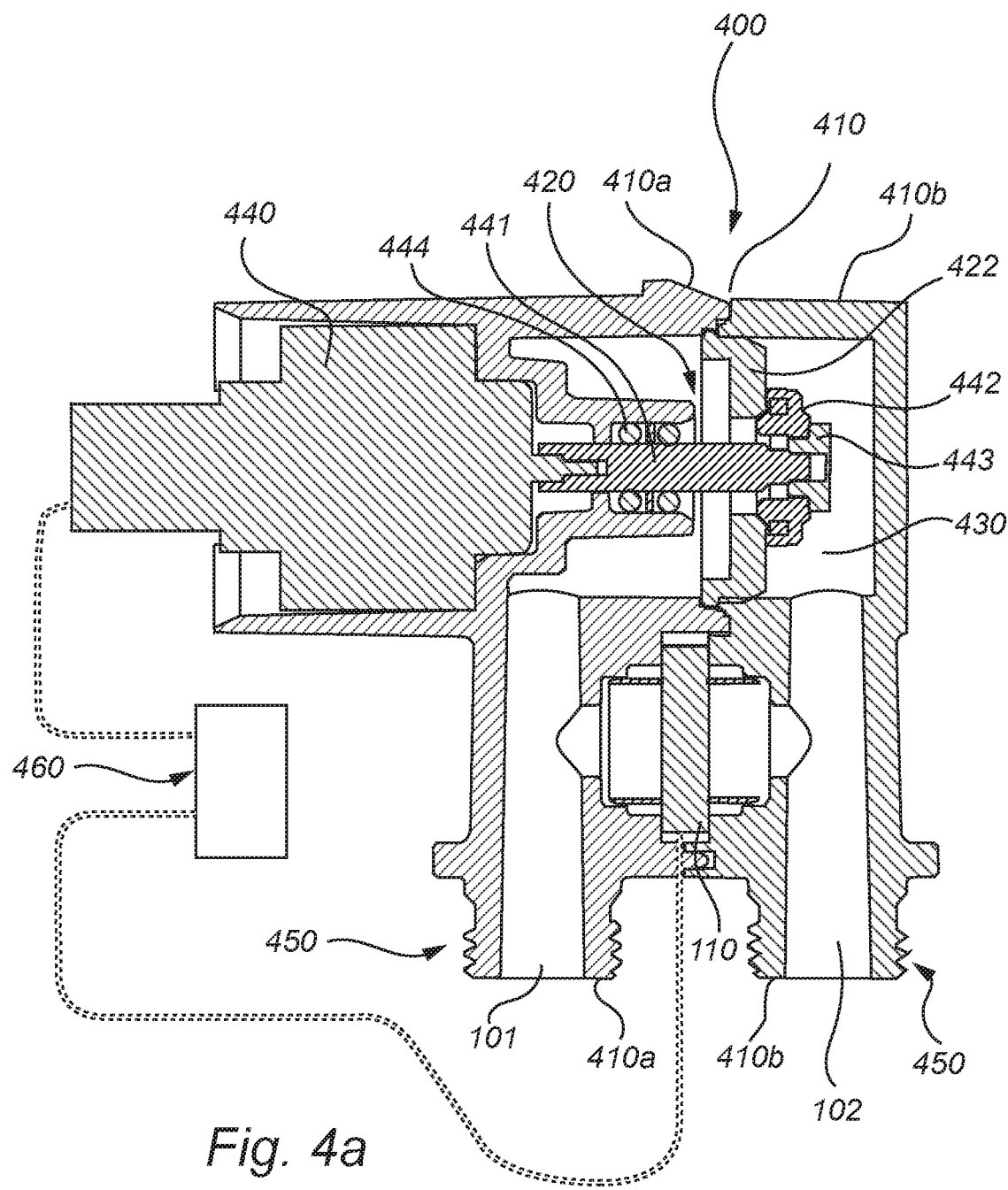
FIG. 4a is a cross sectional view of a measurement module in accordance with at least one embodiment of the invention.
Figure 4B:
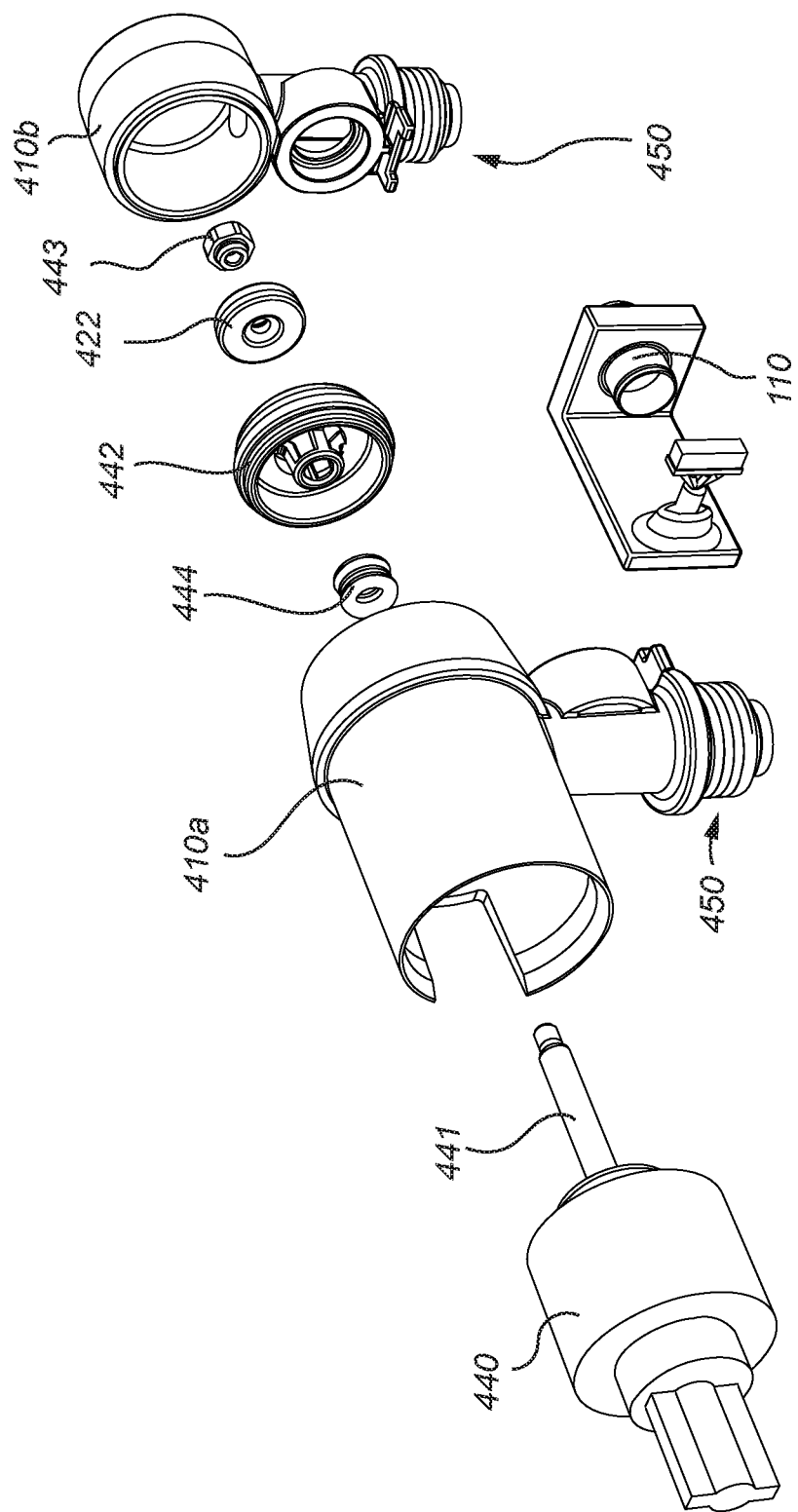

Now, another embodiment of the present invention will be described with reference to both FIG. 4a and FIG. 4b. FIG. 4a is a cross sectional view of a measurement module 400 and FIG. 4b is an exploded perspective view of the same measurement module 400.

The measurement module 400 comprises a first connection line 101, a second connection line 102, a DPS 110, and a safety valve 420 also operating as a calibration actuator.

The outside of the first and second connection line 101, 102 has a threaded portion 450 for facilitating connection and attachment to e.g. the measuring nipples of a control valve 203 as shown in FIGS. 2a-2b. The DPS 110 is arranged between the first and second connection line 101, 102.

The components of the measurement module 400 are arranged in housing 410. The housing 410 may be molded or additively manufactured. The housing 410 may be made of a plastic material or at least partly made of metal. The housing 410 may be made in two or more parts, such as parts 410a, 410b indicated in FIG. 4a and FIG. 4b, and then assembled. By making the housing 410 in several parts, the insertion and/or assembly of the measurement module 400 is facilitated as understood by the exploded view in FIG. 4b.

The measurement module 400 comprises a powered actuator 440, in this case an electric actuator 440. The powered actuator may of course use other means for power, such as pneumatic, hydraulic etc. The electric actuator may be an electric motor, or a linear electric actuator. The electric actuator 440 is operatively connected via a shaft 441 to a valve plug 442. The electric actuator 440 is sealed from fluid(s) in a connecting chamber 430 along the shaft 441 with seal 444. The valve plug 442 is attached to the shaft 441 with a fastening element 443. The fastening element 443 may be a threaded nut. An end portion of the shaft 441, i.e. the distal end portion as seen from the electric actuator 440, may be threaded to facilitate the attachment. The electric actuator 440 is arranged to provide a reciprocal movement of the shaft 441 and the valve plug 442.

The shaft 441 and the valve plug 442 are at least partly arranged in the connecting chamber 430 arranged between between the first and second connection line 101, 102.

The measurement module 400 comprises a valve seat 422 arranged in the connecting chamber 420 the first and second connection line 101, 102. The valve seat 422 may, as shown in FIG. 4a, be arranged in the center of the connecting chamber 420. Alternatively, the valve seat 422 may be arranged closer to the first or the second connection line 101, 102 (not shown). The valve seat 422 is fixated within the connecting chamber 430.

FIG. 4a illustrates a closed state of the safety valve 420 where the valve plug 442 mates with the valve seat 422 in order to prevent a fluid flow between the first and second connection lines 101, 102. In the open state the electric actuator 440 extends the shaft and valve plug 442, i.e. towards the right and the second connection line as seen in FIG. 4a, in order to allow fluid to flow through the opening thus formed between the valve plug 442 and the valve seat 422.

The measurement module 400 may further comprise a control unit 460 connected to the DPS 110 and to the electric actuator 440. The control unit 460 is configured to set the open state, i.e. to control the electric actuator to perform an extending movement, if a pressure difference between the first and second connection line 101, 102 reaches a differential pressure threshold to equalize the pressure between the first and second connection line 101, 102. The control unit 460 may comprise a microprocessor with thereupon stored computer program code. Alternatively, the control unit may comprise a general purpose processor and a non-transitory memory which stores computer program code, which code when executed by the processor causes the control unit to continuously monitor the measured differential pressure, and if the differential pressure exceeds the differential pressure threshold, actuate the powered actuator 440 in order open the safety valve 420.

The control unit 460 may be configured to control the electric actuator 440 to set the safety valve 420 in the open state while no measurements are performed by the DPS 110. The control unit 460 may further be configured to set the safety valve 420 in the closed state prior to or while measurements are performed by the DPS 110.

In use, the safety valve 420 is set in the open state by the electric actuator 440 while no measurements are performed. Thereby, there is no risk that a pressure difference between the first and second connection line 101, 102 harms the DPS 110. The open state of the safety valve 420 means that the two sides of the DPS 110 are subjected to the same pressure, this means that prior the any measurement, the control unit 460 may zero-point calibrate the DPS 110. Prior to a measurement being performed, the control unit 460 operates the electric actuator 440 to close the safety valve 420. During the closing operation, the pressure difference is measured and monitored by the DPS 110 and the control unit 460. If a pressure difference between the first and second connection line 101, 102 exceeds a differential pressure threshold, the closing operation is halted and the control unit 460 operates the electriic actuator to open the safety valve 420 to protect the DPS 110. Optionally, an information message may be sent to the measurement system and/or operator comprising the information that a closing information would raise the pressure difference above the differential pressure threshold. Likewise, if a pressure difference above the differential pressure threshold is detected during measurement, the control unit 460 actuates the electric actuator to open the safety valve 420 in order to protect the DPS 110. After a measurement has been performed by the DPS 110, the contol unit 460 may operate the electric actuator 440 to open the safety valve 420. Hence, it should be understood that while no measurements are performed, the DPS 110 may be, intermittently or continuously, zero-point calibrated as a fluid flow is allowed through the safety valve 420, and gas bubbles which may have formed are flushed through the measurement module 400.

In an alternative embodiment, the safety valve 420 is set in the closed state by the electric actuator 440 while no measurements are performed. Prior to a measurement being performed, the control unit 460 operates the electric actuator 440 to open the safety valve 420 in order to zero-point calibrate the DPS 110. Further, the control unit 460 may continuously monitor the pressure difference using the DPS 110, and if a pressure difference which exceeds the differential pressure threshold is detected, the control unit 460 operates the electric actuator 440 to open the safety valve 420 in order to protect the DPS 110.

It is of course understood that variations to the shown embodiments may be effected and still be within the scope of the invention, for example the first and second valve plates may be integrated into a single unit for the embodiment shown in FIG. 3. The safety valves shown in FIGS. 3 and 4 may both be included in a measurement module in order to increase the safety. The measurement module(s) shown and described may be connected to the grid or comprise an energy storage, such as a battery, for their independent operation.

The connecting chamber(s) and connection lines shown in the drawings may be understood to have a generally circular cross section, or an oval cross section, or a polygonal cross section.

The skilled person realizes that a number of modifications of the embodiments described herein are possible without departing from the scope of the invention, which is defined in the appended claims.

The invention claimed is:

1. A measurement module for measuring the differential pressure between a first and a second connection point arranged in a transport line for a fluid, the measurement module comprises:
    a first connection line for being connected to the first connection point, and a second connection line for being connected to the second connection point;
    a differential pressure sensor arranged in fluid communication with said first and second connection lines;
    a valve arranged in fluid communication with said first and second connection lines, said valve having an open state and a closed state, wherein said valve in said open state fluidly connects said first and second connection lines via said valve, wherein said valve in said closed state prevents fluid flow between said first and second connection lines via said valve,
    wherein said first connection line is adapted to be connected to the first connection point and is configured to extend from said first connection point to said valve, and said second connection line is adapted to be connected to the second connection point and is configured to extend from said second connection point to said valve, and
    wherein, compared to said valve, said differential pressure sensor is arranged closer to the first and the second connection points;
    an actuator for actuating said valve into said open state for enabling fluid to be flushed through the measurement module; and
    means for calculating a flushing time based on a differential pressure measured by the differential pressure sensor.

2. A measurement module according to claim 1, wherein said valve comprises biasing means for biasing said valve towards said closed state.

3. A measurement module according to claim 2, wherein said biasing means are formed by at least one resilient member connected to at least one of a valve plug or a valve seat, wherein said at least one of a valve plug or a valve seat is arranged in a connecting chamber between said first and second connection lines, and said at least one of a valve plug or a valve seat is configured to, in said closed state, prevent a fluid flow between said first and second connection lines and in said open state enable a fluid flow between said first and said second connection lines.

4. A measurement module according to claim 3, wherein said valve is a safety valve, wherein said at least one resilient member is configured to set said open state by allowing said valve plug or valve seat to move within said connecting chamber if a pressure difference between said first and second connection lines reaches a differential pressure threshold to equalize the pressure between said first and second connection lines.

5. A measurement module according to claim 4, wherein said valve comprises a first resilient member connected to a valve seat and a second resilient member connected to a valve plug, wherein said first resilient member and said valve seat are arranged on a first side of said connecting chamber towards said first connection line, and wherein said second resilient member and said valve plug are arranged on a second side of said connecting chamber towards said second connection line, and wherein said valve seat and said valve plug are in contact in said closed state.

6. A measurement module according to claim 1, wherein said actuator is a calibration actuator for actuating said valve into said open state for enabling a zero-point calibration of said differential pressure sensor.

7. A measurement module according to claim 6, wherein said calibration actuator is arranged to move one of said first and second valve plug or valve seat when actuating said valve.

8. A measurement module according to claim 6, wherein said calibration actuator is a manual calibration actuator or wherein said calibration actuator is a powered actuator.

9. A measurement module according to claim 6, wherein said calibration actuator comprises a powered actuator, and the measurement module further comprises a control unit connected to said differential pressure sensor and to said powered actuator for setting said open state if a pressure difference between said first and second connection lines reaches a differential pressure threshold to equalize the pressure between said first and second connection lines.

10. A measurement module according to claim 9, wherein said control unit is configured to control said powered actuator to set said valve in said open state while no measurements are performed by said differential pressure sensor, and wherein said control unit is configured to set said valve in said closed state prior to or while measurements are performed by said differential pressure sensor.

11. A measurement module according to claim 1, wherein said differential pressure sensor is arranged between said first and second connection lines.

12. A measurement module according to claim 1, further comprising a power supply and a non-transitory memory, wherein said non-transitory memory is connected to said power supply and said differential pressure sensor for storing measurement values from said differential pressure sensor.

13. A measurement module according to claim 1, further comprising a power supply and a wired or wireless transceiver for transmitting measurement values from said differential pressure sensor.

14. A measurement module according to claim 1, wherein said valve is a safety valve.

15. A measurement system comprising a measurement module according to claim 1, and a data collection unit for connecting to the measurement module and performing a differential pressure measurement using the measurement module.

16. A measurement module for measuring the differential pressure between a first and a second connection point arranged in a transport line for a fluid, the measurement module comprises:
- a first connection line for being connected to the first connection point, and a second connection line for being connected to the second connection point;
- a differential pressure sensor arranged in fluid communication with said first and second connection lines;
- a valve arranged in fluid communication with said first and second connection lines, said valve having an open state and a closed state, wherein said valve in said open state fluidly connects said first and second connection lines via said valve, wherein said valve in said closed state prevents fluid flow between said first and second connection lines via said valve,
- wherein said first connection line is adapted to be connected to the first connection point and is configured to extend from said first connection point to said valve, and said second connection line is adapted to be connected to the second connection point and is configured to extend from said second connection point to said valve, and
- wherein, compared to said valve, said differential pressure sensor is arranged closer to the first and the second connection points,
- wherein said valve comprises biasing means for biasing said valve towards said closed state,
- wherein said biasing means are formed by at least one resilient member connected to at least one of a valve plug or a valve seat, wherein said at least one of a valve plug or a valve seat is arranged in a connecting chamber between said first and second connection lines, and said at least one of a valve plug or a valve seat is configured to, in said closed state, prevent a fluid flow between said first and second connection lines and in said open state enable a fluid flow between said first and said second connection lines,
- wherein said valve is a safety valve, wherein said at least one resilient member is configured to set said open state by allowing said valve plug or valve seat to move within said connecting chamber if a pressure difference between said first and second connection lines reaches a differential pressure threshold to equalize the pressure between said first and second connection lines.

17. A measurement module according to claim 16, wherein said valve comprises a first resilient member connected to a valve seat and a second resilient member connected to a valve plug, wherein said first resilient member and said valve seat are arranged on a first side of said connecting chamber towards said first connection line, and wherein said second resilient member and said valve plug are arranged on a second side of said connecting chamber towards said second connection line, and wherein said valve seat and said valve plug are in contact in said closed state.

18. A measurement module according to claim 16, wherein said differential pressure sensor is arranged between said first and second connection lines.

19. A measurement module according to claim 16, further comprising a power supply and a non-transitory memory, wherein said non-transitory memory is connected to said power supply and said differential pressure sensor for storing measurement values from said differential pressure sensor.

20. A measurement module according to claim 16, further comprising a power supply and a wired or wireless transceiver for transmitting measurement values from said differential pressure sensor.

* * * * *